(12) United States Patent
Gaiotti et al.

(10) Patent No.: US 11,104,038 B2
(45) Date of Patent: Aug. 31, 2021

(54) PREFORM FOR PLASTIC CONTAINER WITH THIN BOTTOM

(71) Applicant: S.I.P.A. SOCIETA' INDUSTRIALIZZAZIONE PROGETTAZIONE E AUTOMAZIONE S.P.A., Vittorio Veneto (IT)

(72) Inventors: David Gaiotti, Susegana (IT); Laurent Sigler, Boust (FR); Dino Enrico Zanette, Godega di Sant'urbano (IT); Matteo Zoppas, Conegliano (IT)

(*) Notice: Subject to any disclaimer, the term of this patent is extended or adjusted under 35 U.S.C. 154(b) by 0 days.

(21) Appl. No.: 15/021,520

(22) PCT Filed: Sep. 15, 2014

(86) PCT No.: PCT/EP2014/069632
§ 371 (c)(1),
(2) Date: Mar. 11, 2016

(87) PCT Pub. No.: WO2015/036596
PCT Pub. Date: Mar. 19, 2015

(65) Prior Publication Data
US 2016/0229087 A1 Aug. 11, 2016

(30) Foreign Application Priority Data
Sep. 13, 2013 (IT) .................... RM2013A000510

(51) Int. Cl.
*B29B 11/14* (2006.01)
*B29C 49/02* (2006.01)
(Continued)

(52) U.S. Cl.
CPC .............. *B29B 11/14* (2013.01); *B29C 49/02* (2013.01); *B29B 11/08* (2013.01); *B29B 11/12* (2013.01);
(Continued)

(58) Field of Classification Search
CPC . B29B 2911/14331; B29B 2911/14332; B29B 2911/1464; B29B 2911/1498;
(Continued)

(56) References Cited

U.S. PATENT DOCUMENTS 5,660,905 A * 8/1997 Mero .................. B29C 49/4823
428/36.92
5,829,614 A * 11/1998 Collette .................. B29C 49/12
215/375
(Continued)

FOREIGN PATENT DOCUMENTS

EP    0482652       4/1992
EP    0482652 B1 *  5/1996 ............. B29C 49/00
(Continued)

OTHER PUBLICATIONS

Italian Search Report and Written Opinion dated Nov. 25, 2014 for corresponding International patent application No. PCT/EP2014/069632.

*Primary Examiner* — Lee E Sanderson
*Assistant Examiner* — Michael C Romanowski
(74) *Attorney, Agent, or Firm* — Abelman, Frayne & Schwab; Stefan Knirr

(57) ABSTRACT

The invention relates to a new PET preform design that enables a more precise distribution of material in the bottle bottom and avoids the waste of material around the injection point. The thickness $BWT_{min}$ of the wall at the center of the gate or tip (3) (injection point) is reduced to a minimum in order to avoid the waste of material around the injection point when the preform is blown. This is particular important for carbonated soft drink application since the reduced amount of amorphous material at the center of the gate (3) helps to reduce the risk of stress cracking on the bottle base. Furthermore a step (4) having thickness $WT_{max}$ in the body wall thickness, in the region of the periphery of the base with (Continued)

$WT_{max} > WT$, allows enough material to be available for the proper blowing of the bottle bottom making the bottle more stable.

5 Claims, 6 Drawing Sheets

(51) Int. Cl.
    *B29B 11/08*     (2006.01)
    *B29L 31/00*     (2006.01)
    *B29B 11/12*     (2006.01)
    *B29C 49/06*     (2006.01)
    *B29K 67/00*     (2006.01)

(52) U.S. Cl.
    CPC ........... *B29B 2911/14013* (2013.01); *B29B 2911/1464* (2013.01); *B29B 2911/14326* (2013.01); *B29B 2911/14332* (2015.05); *B29B 2911/14633* (2013.01); *B29B 2911/14933* (2013.01); *B29C 49/06* (2013.01); *B29C 2049/028* (2013.01); *B29K 2067/003* (2013.01); *B29L 2031/712* (2013.01); *B29L 2031/7158* (2013.01)

(58) Field of Classification Search
    CPC . B29B 2911/14633; B29B 2911/14586; B29B 2911/14326; B29L 2031/7158; B29C 49/06
    USPC ....................................................... 428/35.7
    See application file for complete search history.

(56) References Cited

U.S. PATENT DOCUMENTS

| | | | |
|---|---|---|---|
| 5,888,598 A * | 3/1999 | Brewster | B29C 49/0005 264/513 |
| 6,841,262 B1 | 1/2005 | Beck et al. | |
| 2009/0078672 A1 * | 3/2009 | Parrinello | B65D 1/0284 215/383 |
| 2010/0304169 A1 * | 12/2010 | Dornbach | B29B 11/14 428/542.8 |

FOREIGN PATENT DOCUMENTS

| | | | | |
|---|---|---|---|---|
| JP | 6198719 A | | 7/1994 | |
| JP | 2003-25397 A | | 1/2003 | |
| JP | 2008178994 | | 8/2008 | |
| JP | 2009-045876 | * | 3/2009 | ............ B29B 11/14 |
| JP | 2009-51729 A | | 4/2009 | |
| WO | 97/32711 | | 9/1997 | |
| WO | 2005/115723 | | 12/2005 | |
| WO | 2012/075578 | | 6/2012 | |

* cited by examiner

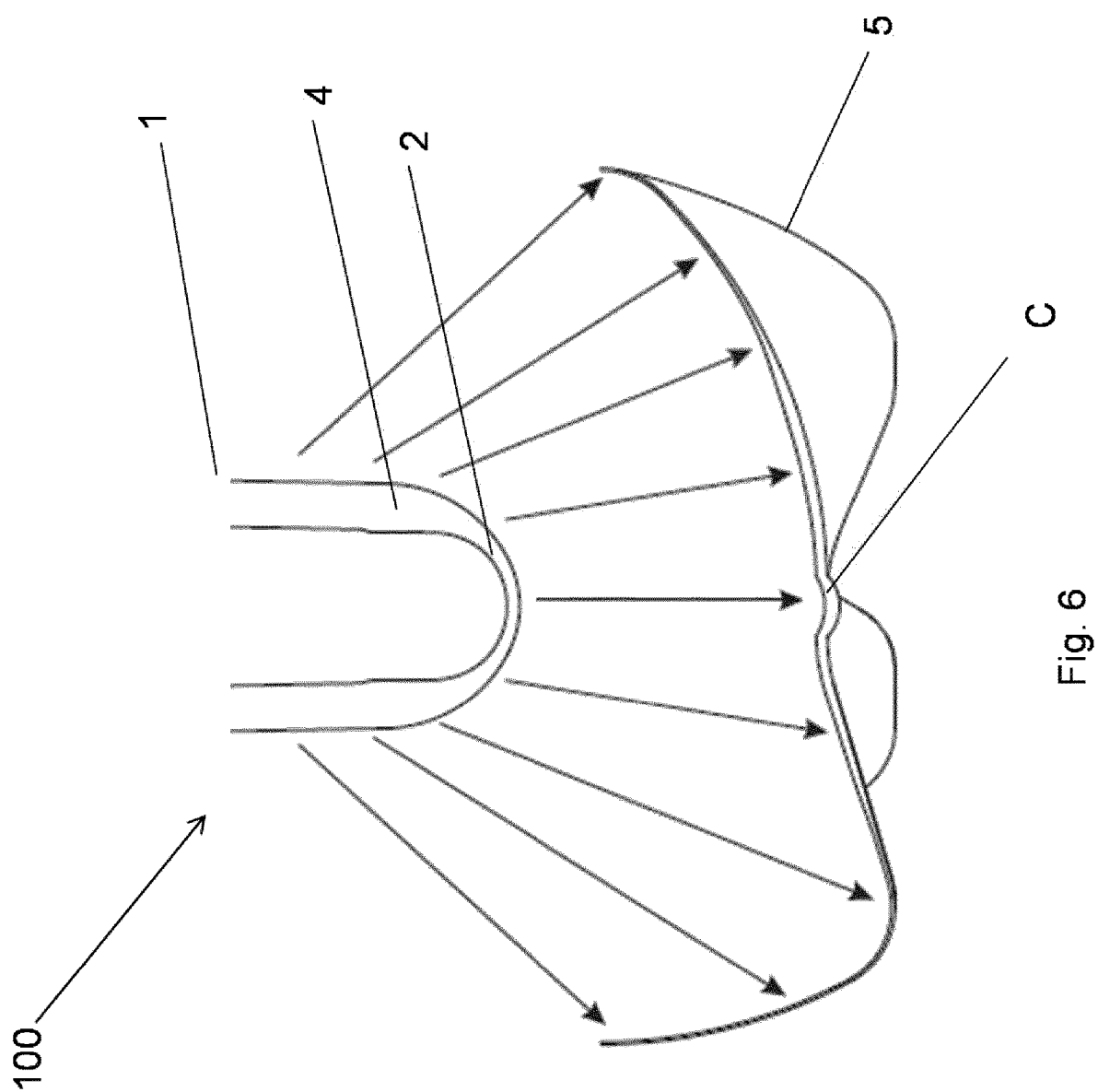

PREFORM FOR PLASTIC CONTAINER WITH THIN BOTTOM

CROSS REFERENCE TO RELATED APPLICATIONS

This application is a national phase of PCT application No. PCT/EP2014/069632, filed Sep. 15, 2014, which claims priority to IT patent application No. RM2013A000510, filed Sep. 13, 2013, all of which are incorporated herein by reference thereto.

FIELD OF THE INVENTION

The present invention relates to a preform in plastic material, such as PET or other suitable material, used for example for making small-size containers for beverages or other liquids by means of injection compression blow molding.

STATE OF THE ART

For economic reasons, the trend followed by the manufacturers of PET containers is to reduce as much as possible the weight, and therefore the amount of resin used, while maintaining the technical performance of the containers themselves, as mainly disposable containers. To achieve this result it is necessary to make lighter preforms. Particular attention is given by the designers to the performance of small sized final containers, e.g. of bottles with a capacity less than a liter, in particular of bottles that have a capacity comprised between 25 and 50 cl, which represent a large share of the beverages market. In particular the bottles for water not containing $CO_2$ with a weight between 6 and 15 g present very difficult challenges, because there is not much thermoplastic material for stretching up to the limit of its structural strength in the various zones constituting the container which can be designed with complex shapes. In designing such containers, a top priority is constituted by the complex of the technical performance of this category of blown containers that have very thin body walls and still must maintain resistance to axial load, burst strength for cases in which there is the addition of nitrogen and resistance to deformation in the radial direction. With the traditional injection technology, for several years now preform design limitations regarding the thicknesses of the different zones of the wall have been in place and, in particular, it is known and commonly accepted in the PET preform industry that a certain ratio must be ensured between the constant Bottom Wall Thickness (BWT) of a preform and its side Wall Thickness (WT). Typically, this ratio must be within the following range:

$$0.7 \leq BWT/WT \leq 0.95.$$

With such a ratio, it can be observed that injection of a preform can be performed without stressing too much the material at the gate portion since sufficient room is left for the molten PET to travel between the top of the core and the injection point on the gate insert side. However, if the BWT/WT ratio of 0.7 minimum is not guaranteed, there is then a high risk of excessive stress around the injection point which can: 1) either lead to crystallinity in the preform tip due to the known phenomenon of stress induced crystallinity or 2) prevent a proper and complete filling of the preform mold since a thickness restriction in front of the injection point may prevent an easy flow of the PET melt in this section, and additionally, it may lead to an excessive freezing of the molten PET in this area which may make it difficult for the colder melt to reach the Top Sealing Surface (TSS) of the preform (risk of short shot). Such a ratio is about the same, both for beverage with $CO_2$ (carbonated soft drinks=CSD) or without $CO_2$. In this situation it is difficult to reduce the amount of PET because of the structural limitation on the wall thickness. Making a wall thickness of the preform below 2 mm with the traditional injection methods is particularly difficult because of the large frictional forces that develop, opposing to the sliding of PET within the same cavity of the injection mold. The need to achieve an innovative preform which can overcome the above drawbacks is therefore particularly felt.

SUMMARY OF THE INVENTION

The primary purpose of the present invention is to provide a preform in plastic material, for the construction of a container, in particular a PET bottle of small size by blow-molding or stretch blow-molding, having a geometry such as to ensure an optimal blow molding quality of a container.

Another no less important aim of the invention is to obtain a preform optimally lightened by means of an injection-compression molding process. The injection compression molding technology offers new possibilities for designing preforms since the traditional limitations on the preform wall thicknesses can be overcome. Thus the aim of the invention is achieved by a preform made of PET and having a weight lower than 20 g, according to claim 1, adapted to make through a blow molding process a final blown container, said preform comprising:
  a neck portion,
  a bottom portion whose tip, defining the preform tip, defines a minimum bottom wall thickness $BWT_{min}$ and
  a body portion extending between the bottom portion and the neck portion, and defining a side wall thickness WT, wherein there is a gradual transition in the wall thickness from said minimum bottom wall thickness $BWT_{min}$ to said side wall thickness WT, said transition terminating at an end of the bottom portion, and wherein the ratio $BWT_{min}/WT$ is comprised between 0.20 and 0.55.

Advantageously the geometry of the preform of the invention allows to obtain, with respect to known preforms, a further reduction of the overall weight of the final container. The weight of the new containers will be between 6 grams for water bottles and less than 20 grams for CSD beverages while maintaining mechanical properties at least equal to the equivalent bottles of the state of the prior art that have a weight comprised between 7 and 21 grams.

The dependent claims describe preferred embodiments of the invention.

BRIEF DESCRIPTION OF FIGURES

Further characteristics and advantages of the invention will become apparent in light of the detailed description of a preferred embodiment, but not exclusive, of a preform in plastic material, illustrated by way of example and not limitation, with the aid of the accompanying drawings in which:

FIG. 6 represents the formation of the bottom of the bottle by the operation of stretch blow molding of a preform according to the invention.

The same reference numbers in the figures identify the same elements or components.

DESCRIPTION IN DETAIL OF A PREFERRED EMBODIMENT OF THE INVENTION

Figure 1:
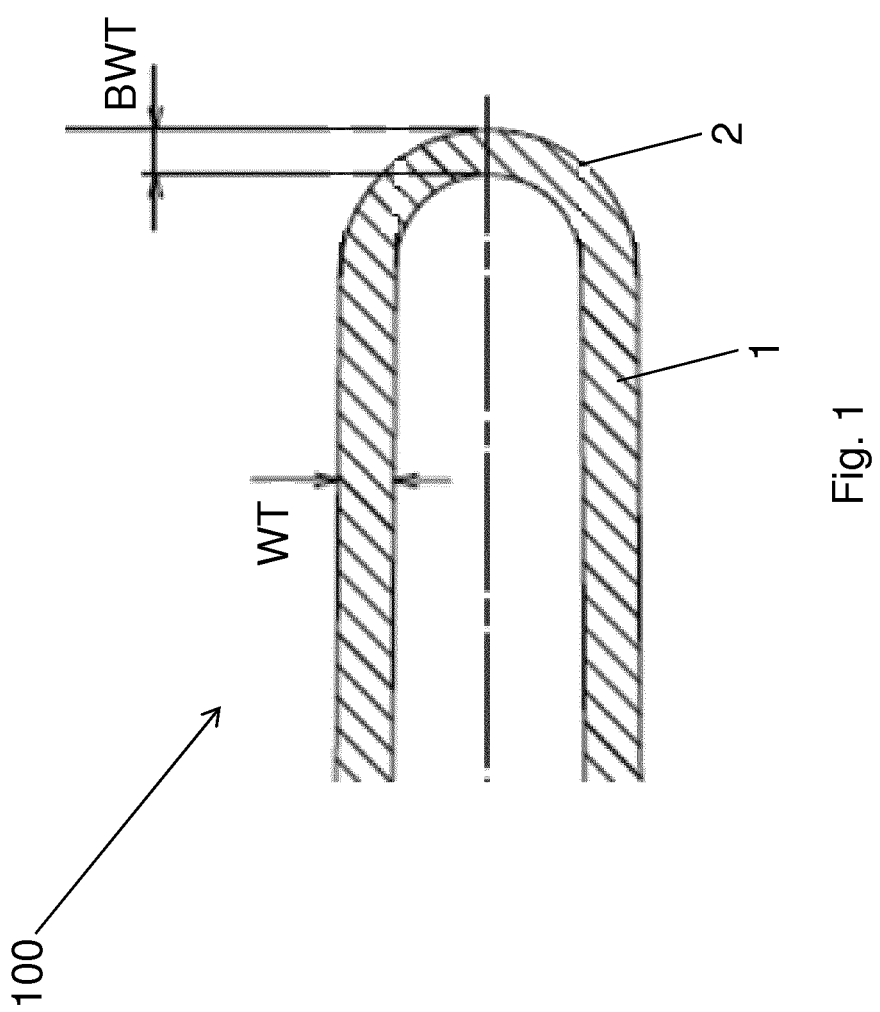
FIG. 1 represents the BWT/WT ratio for typical CSD application.
Figure 2:
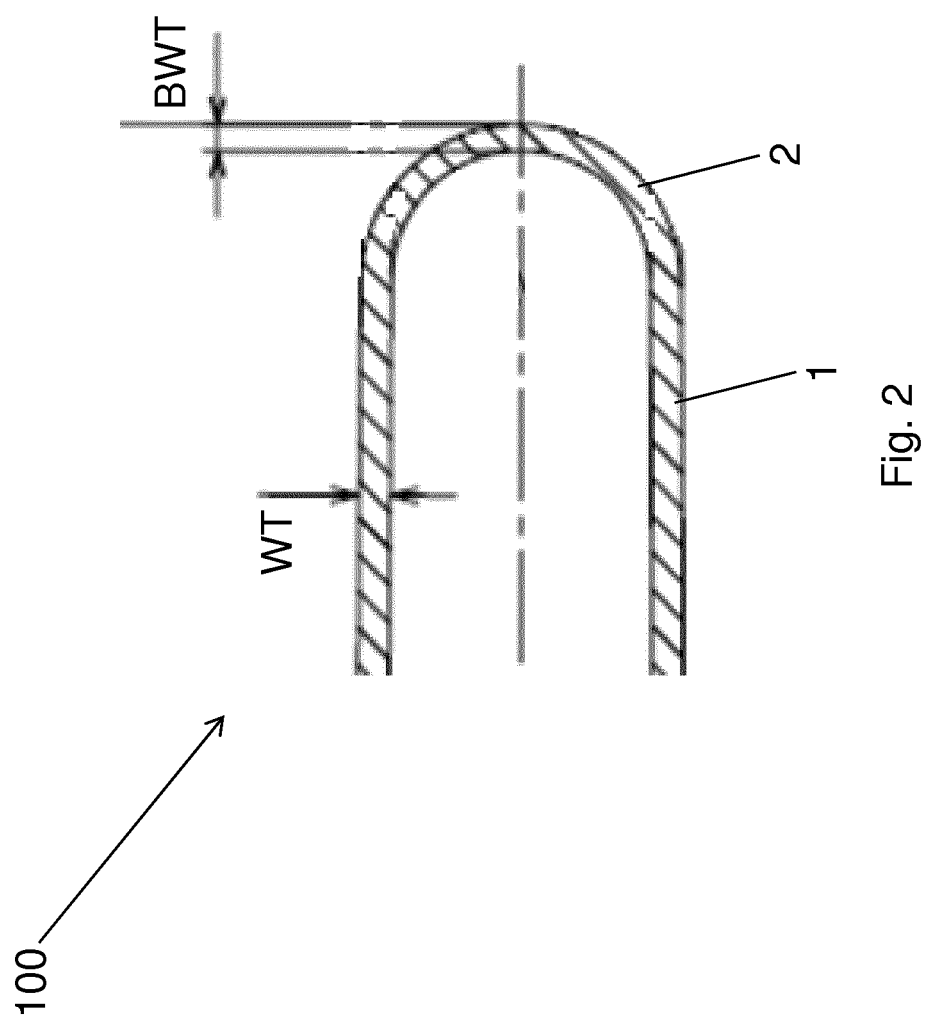
FIG. 2 represents the BWT/WT ratio for typical water application.
Figure 3:
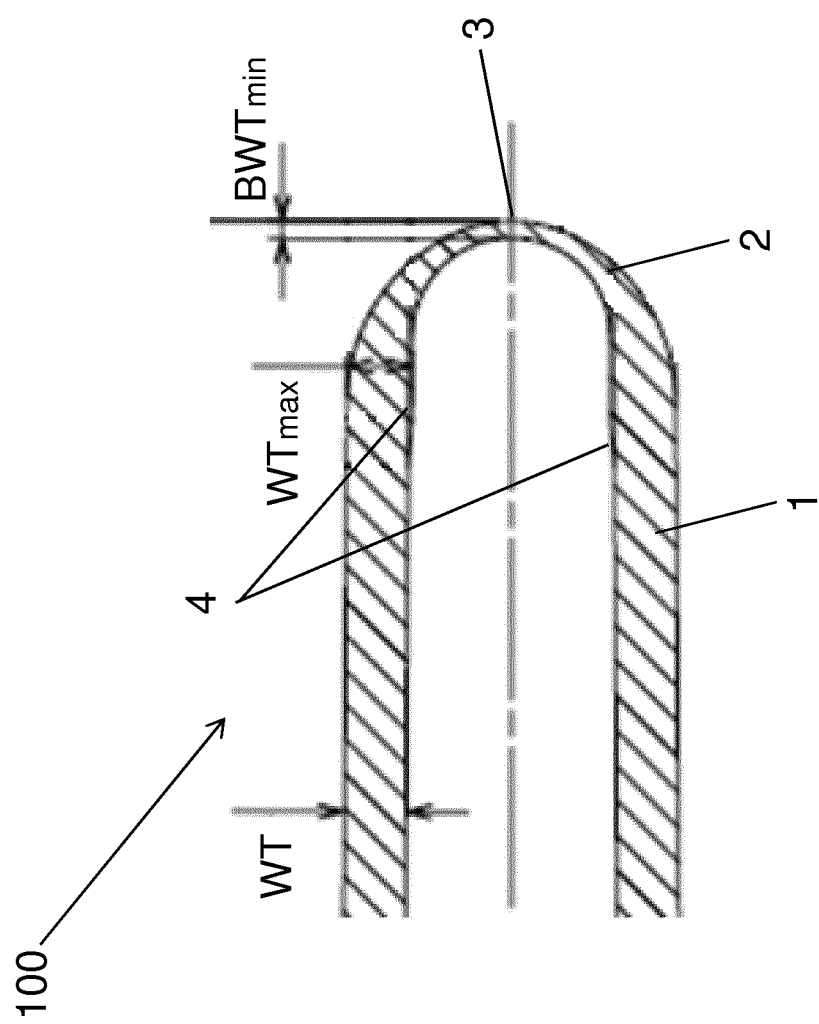
FIG. 3 represents the shape and the $BWT_{min}/WT$ ratio of the preform according to the invention for CSD application.
Figure 4:
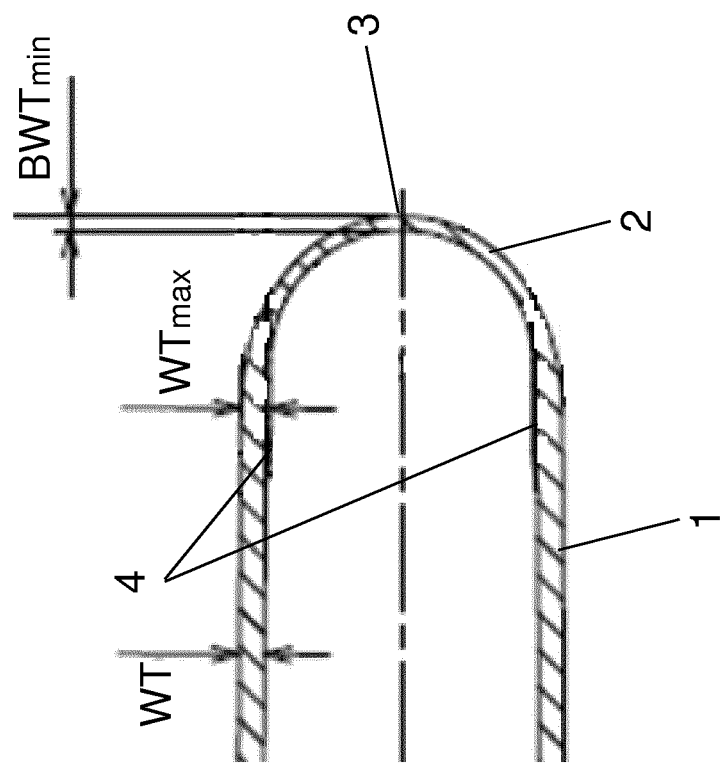
FIG. 4 represents the shape and the $BWT_{min}/WT$ ratio of the preform according to the invention for water application.

The injection compression process (ICP) technology developed by the authors of the present invention offers new possibilities for the design of preforms since the traditional limitations on the preform wall thicknesses can be overcome. Since the position/distance of the core towards the injection point on the gate insert side is not fixed during the entire injection-compression process, which means that the room/space between the core tip and the gate insert is bigger at the start of the injection-compression process and only gets reduced at the last stage of the process when the compression phase occurs, the following $BWT_{min}/WT$ ratio is now applicable:

$$0.20 \leq BWT_{min}/WT \leq 0.55, \text{ preferably } 0.25 \leq BWT_{min}/WT \leq 0.55.$$

where $BWT_{min}$ is the minimum bottom wall thickness, that is the bottom wall thickness at the preform tip. This means that the preform wall thickness in the preform tip area can be optimized and wasted material around the injection point can be substantially reduced. If we compare two preforms producing the same bottle, one produced with the traditional injection technology, FIGS. 1 and 2, and the other one produced with ICP, FIGS. 3 and 4, the one produced with ICP will have a lighter base since there is no need to guarantee a minimum ratio of 0.7 in this case, so the wall thicknesses in the preform tip area will be smaller. FIG. 1 represents a state of the art design of the final part 100 of a preform for carbonated soft drinks (CSD), where reference 1 indicates a body portion and reference 2 indicates the bottom portion terminating in the point of support of the petals, where the body 1 begins. In this example the bottom wall thickness BWT is constant and the ratio BWT/WT is of the order of 0.8 and the weight of the final bottle is 21 grams. FIG. 2 shows a preform for water bottle of the state of the art. In this example the bottom wall thickness BWT is constant and the ratio BWT/WT is of the order of 0.83 and the weight of the final bottle is 7.2 grams. FIGS. 3 and 4 are two examples of preform according to the invention, where the bottom wall thickness BWT is not constant, to be compared with the examples given in FIGS. 1 and 2. The CSD preform, FIG. 3, according to the new design presents a thinner zone around the gate 3, with the thinner point at the tip of the gate 3. For the preform of FIG. 3 the ratio $BWT_{min}/WT$, where $BWT_{min}$ represents the Bottom Wall Thickness at the point on the gate 3, where the thickness has the minimum value, is of the order of 0.25 and the weight of the preform is only 19.6 grams. FIG. 4 represents the same concept for a preform of a water bottle: in this case the ratio $BWT_{min}/WT$ is of the order of 0.55 and the weight is of the order of 6.0 grams. It is worth repeating that the numbers given are only an example that not limit in any way the extent of the invention.

Preferably a preform according the invention, suitable for a carbonated soft drink bottle, has a ratio $BWT_{min}/WT$ between 0.20 and 0.30 (limit values included). Preferably a preform according the invention, suitable for a non-carbonated soft drink bottle, has a ratio $BWT_{min}/WT$ between 0.50 and 0.55 (limit values included). From the center of the gate 3, where the bottom wall thickness has the minimum value $BWT_{min}$, the thickness of the wall increases gradually to reach the side wall thickness WT of the preform body at the point of support of the petals. The preform thickness at the center of the gate 3, that is at the preform tip, is reduced to a minimum in order to reduce the amount of amorphous material around the injection point of the preform thus leading to less wasted material in this area and enhanced bottle performances in terms of thermal stability and stress cracking, that is particularly important for CSD applications since the risk of stress cracking on the bottle base is one of the main risks for products in PET containing CSD. A challenge in the design of the preform is to achieve a distribution of the PET material in the wall zones where it is needed, which means exactly in the peripheral part of the base and not around the injection point (excess material around the injection point is useless for the bottle mechanical performance). To improve this aspect the body 1 of the preform, according to the invention, presents, in the region where the preform portion having side wall thickness WT ends, a wall step 4 having a thickness $WT_{max}$ higher than the side wall thickness WT. Said thickness $WT_{max}$ is between 4% and 20% higher than said side wall thickness WT.

The step 4 is therefore placed between the body portion 1 and the bottom portion 2 of the preform, that is between the end of the body portion 1 and the end of the bottom portion 2, corresponding to the point of support of the petals of the blown container in the case of a petaloid bottom.

Figure 5:
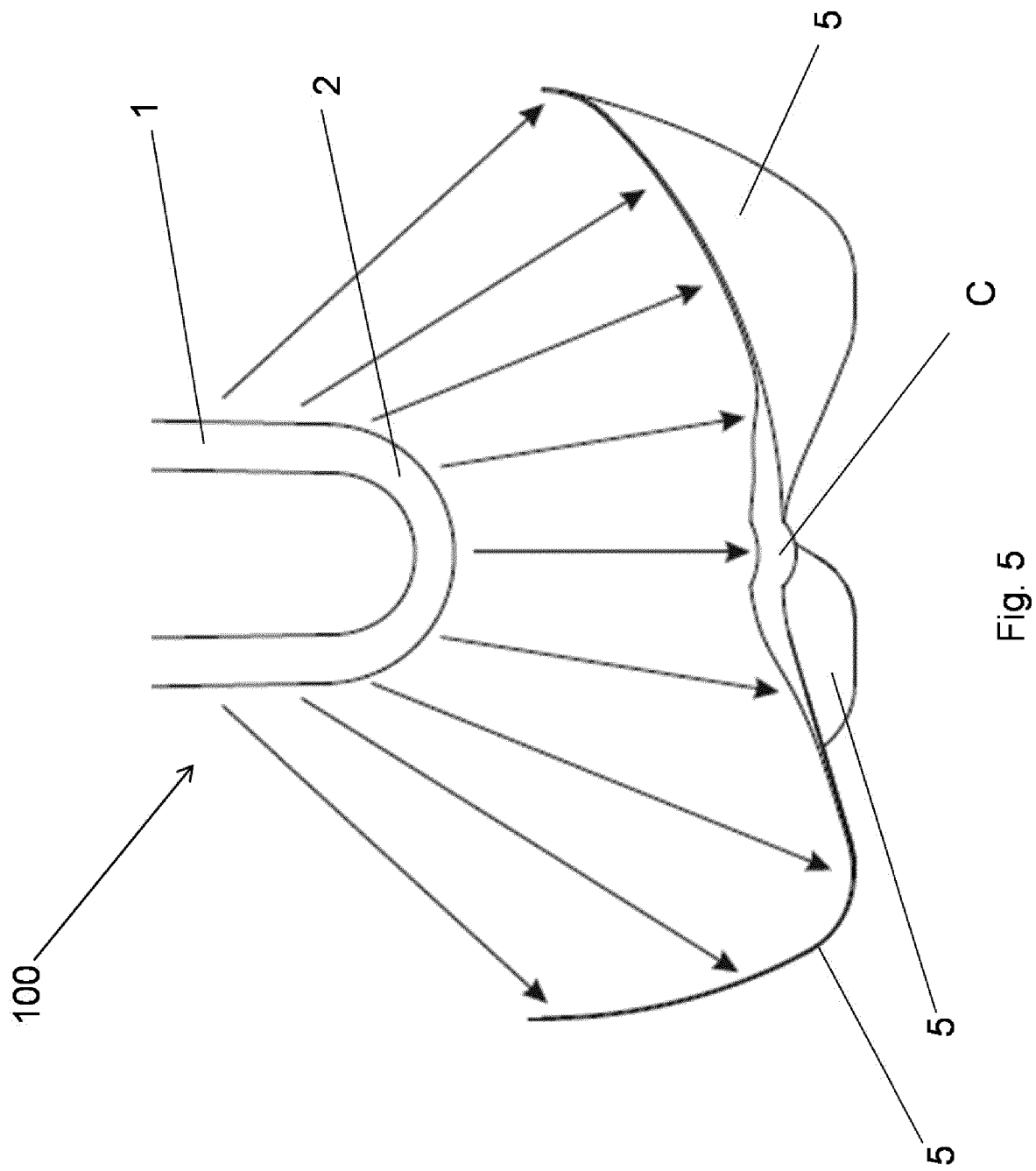
FIG. 5 represents the formation of the bottom of the bottle by the operation of stretch blow molding of a preform of the standard technology.

This "step core" design with two different thicknesses (WT and $WT_{max}$), the wall step being indicated with 4 in the FIGS. 3, 4 and 6, makes it possible to have in the region of the "Step Core" enough material available for the proper blowing of the bottle base (petals), thus improving the stability of the bottle that is very dependent on the thickness of the bottom. With traditional injection technology, it is usually very complicated to have a base strong enough without having wasted material as well around the injection point. Thanks to the ICP preform design, it is now possible to distribute the material more precisely in the bottle base and to avoid a waste of material around the injection point. This aspect is also particularly important for applications suitable for CSD, because the thermal stability of the bottle base is very dependent on the rigidity of the bottle base, so enough material must be distributed into the base to feature a good thermal stability. However, with traditional injection technology, as described before, having base strong enough usually means that some wasted material is placed around the injection point that corresponds to the center of the gate. This is generally accepted, but this wasted material is very sensitive to stress cracking since it is mainly in an amorphous state. When making a preform suitable for ICP, thanks to the invention a better solution is now achieved in terms of thermal stability and less sensitivity to stress cracking. FIGS. 5 and 6 show a scheme that represents how the preform is transformed in the final bottle during the process of stretch-blow molding. In FIG. 5, where reference 5 indicates the petals, it is apparent that the old technique leaves too much material at the center C of the bottom of the bottle, where not only it is not needed but also it increases the possibility of stress cracking. In FIG. 6, where reference 4 indicates the wall step in the region of the "Step Core" it is possible to see that a preform with a gradual transition from the minimum bottom wall thickness $BWT_{min}$ to the side wall thickness WT leaves the center C of the bottom of the bottle with much less material. The new design, named "Thin Wall Step Core" or TWSC, can be used with advantages, for application in products such as "CSD", in which the beverage is additive-containing $CO_2$ in the measurement expressed in g/l or volumes of gas, for all levels of carbonation, from the lowest e.g. 2 g/l up to 9 g/l. The new design TWSC allows to make lightweight containers, increases blower performance and broadens the process window of the distribution of the plastic on the base of the container in order to exceed the specifications of caustic stress cracking (CSC) and thermal stability (TS). Stress cracking is a test designed to assess the quality of a container subjected to internal pressure in its most rigid part, namely the central gate present in the base plate. Since the lines of transport of containers, in general, use basic-type slip agents, the carbonated containers must pass a test simulation called caustic stress cracking. This test requires that the container is filled with the drink/water to the designated level of carbonation and immersed for the height of the petal in an aqueous solution of NaOH. For the time of the test the gate must not break, causing the explosion of the bottle. Since the amorphous material is microporous and permeable, if the transition from the gate to the petals is not smooth and sufficiently cooled during the process of stretch blow molding, the transition zone is particularly attackable in the "critical point" by etching of NaOH (base-catalyzed hydrolysis). The alkaline etching leads to rupture of the ester bond with cleavage of the polymer chains and, if the region between petals and injection point presents sparsely oriented zones, the probability that the base of the bottle fails the test of stress cracking is very high. The mechanism takes place with a first step of surface degradation with formation of local craze that can quickly and easily propagate along the profile of the material leading to brittle fracture. In the case of smooth transition as in the invention, however, the greatest stretching confers preferential orientation to the polymeric chains and lowers susceptibility to deterioration due to basic etching. Thermal stability is another test which allows to evaluate the mechanical strength of the bottle, containing carbonated drink, that is placed for a given time in a thermostat at a temperature higher than the ambient temperature of 20° C. The test allows to simulate the storage of the bottle in hot environments. Since carbon dioxide is a gas soluble in water or water-based beverages, there is established an equilibrium between $CO_2$ in the liquid state and $CO_2$ in the gaseous state in function of the temperature, because the solubility decreases with increasing temperature of the gas. This causes an increase of the gaseous phase in the confined volume and an increase of the internal pressure. A consequence is a partial dilatation of the container, with volumetric increase, which in turn significantly lowers the internal pressure, decreases the stiffness due to the interaction PET bottle and heat with possible irreversible deformation of the base called rocker bottom. The stress to which is subjected the bottle bottom interests particularly the structure of the petals and the first part of the transition, and sufficient thickness is necessary to prevent the enlargement of the petals of the container base and the subsequent eversion of the gate that would make the bottle unstable. It is clear that the container must exceed the above-mentioned test of CSC and TS simultaneously, then it becomes necessary to obtain a base for the bottle that satisfies both characteristics, namely that the transition of the gate is tightly stretched and cooled for CSC and that the petals are sufficiently thick and strong to TS. Since the thickness of the gate in a standard preform has a magnitude far superior to the TWSC design, it is difficult to stretch the area of the gate and find a good compromise between the trend of the transition and the thickness on the petals. Precisely because of the binding geometry standard, in state of the art containers very thick transitions are made, in which there is excessive presence of amorphous material, which entails a substantial cooling, to the detriment of the machine cycle time. The advantage of a preform according to the invention is that it optimizes the use of PET, thus obtaining lighter and more performing blown final containers using also the maximum performance of the blower. The "Thin Wall Step Core" preform is designed so that the profile of "Thin Wall" on the gate allows to obtain, on the base of a blown container, a thin and gradual transition that starts at the gate up to the point of support of the petals on the surface, while the profile "Step Core" intakes greater amount of material, compared to state of the art preforms, over the whole profile of the petals. The result translates into a base globally light, in which the amount of material accumulated in the gate, due to traditional preform geometry, through the "TWSC" design is reduced and partially redistributed along the "Step Core" where it will be positioned on the petals profile of the blown bottle, making it robust and easy to be cooled. The advantages of the invention, however, are obtained not only for containers with a petaloid base, but also for containers that may not have a petaloid base, as those used for the mineral water.

According to a preferred embodiment, the preform is provided with a rigid neck portion having a neck ring, wherein the neck is threaded, ad is adapted to make a bottle having a capacity of less than 0.75 liters (L).

The invention claimed is:

1. A preform made of PET and having a weight lower than 20 g, adapted to make through a blow molding process a blown bottle for carbonated soft drinks, said preform comprising:
   a neck portion,
   a bottom portion with a preform tip and with a point of a gate at the preform tip, and
   a body portion extending between the bottom portion and the neck portion, and having a side wall thickness WT,
   wherein the bottom portion has a bottom wall thickness BWT with a thinner point at the point of the gate, said thinner point defining a minimum bottom wall thickness $BWT_{min}$;
   wherein, starting at the point of the gate, the bottom wall thickness BWT of the preform increases continuously to the side wall thickness WT, and wherein the ratio $BWT_{min}/WT$ is between 0.20 and 0.30.

2. The preform according to claim 1, wherein, at an end of the bottom portion, in a region where the side wall thickness WT ends, there is provided a wall step having a thickness $WT_{max}$ higher than said side wall thickness WT.

3. The preform according to claim 2, where the thickness $WT_{max}$ of the wall step is between 4% and 20% higher than said side wall thickness WT.

4. The preform according to claim 1, adapted to make a bottle having a capacity of less than 0.75 L.

5. The preform of claim 1, wherein the preform tip is shaped convexly in a direction of a longitudinal axis of the preform.

* * * * *